United States Patent
Nakatani et al.

(10) Patent No.: US 8,337,767 B2
(45) Date of Patent: Dec. 25, 2012

(54) OZONE GENERATING APPARATUS

(75) Inventors: Hajime Nakatani, Chiyoda-ku (JP);
Daisuke Takauchi, Chiyoda-ku (JP);
Tomoaki Takeda, Chiyoda-ku (JP);
Koichi Tokimori, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 141 days.

(21) Appl. No.: 12/690,651

(22) Filed: Jan. 20, 2010

(65) Prior Publication Data

US 2010/0296980 A1    Nov. 25, 2010

(30) Foreign Application Priority Data

May 19, 2009  (JP) ................................. 2009-121055

(51) Int. Cl.
*B01J 19/08*    (2006.01)
(52) U.S. Cl. .................... 422/186.07; 204/176; 361/225; 361/229; 422/186.03; 422/186.18; 422/186.19
(58) Field of Classification Search ............. 422/186.07, 422/186.03, 186.18, 186.19; 204/176; 361/225, 361/229
See application file for complete search history.

(56) References Cited

U.S. PATENT DOCUMENTS 3,671,417 A  *  6/1972  Louboutin ................ 422/186.18
4,232,229 A  *  11/1980 Tanaka et al. .............. 422/186.2
5,446,615 A  *  8/1995  Matsumoto et al. .......... 361/225
2009/0236042 A1    9/2009  Wada et al.

FOREIGN PATENT DOCUMENTS

| JP | 53-160456 | 12/1978 |
| JP | 8-151201 A | 6/1996 |
| WO | WO 2006/103945 A1 | 10/2006 |

OTHER PUBLICATIONS

Office Action dated Oct. 18, 2011, issued in the corresponding Canadian Patent Application No. 2,699,768.

* cited by examiner

*Primary Examiner* — Xiuyu Tai
(74) *Attorney, Agent, or Firm* — Buchanan Ingersoll & Rooney PC

(57) ABSTRACT

An ozone generating apparatus having high reliability in which a glass tube can prevent from being damaged by melting a power feeding brush even if a large amount of short-circuit current flows. In an ozone generating apparatus using silent discharge, an alternating high voltage power is supplied from a power supply to a metal film formed in an inner wall of a glass tube by a power feeding brush comprising a brush shaft made of metal and a large number of metal thin wires fixed to the periphery of the brush shaft, the following equation satisfies.

$$(D2/D1) \geq 1/\{1+(1/20\beta)\},$$

wherein 'D1' indicates an outer diameter of a bundle of metal thin wires, 'D2' indicates an outer diameter of the brush shaft and 'β' indicates the line density of metal thin wires on a surface of the brush shaft.

10 Claims, 11 Drawing Sheets

OZONE GENERATING APPARATUS

BACKGROUND OF THE INVENTION

1. Field of the Invention

This invention relates to an ozone generating apparatus by utilizing a silent discharge, particularly, relates to an ozone generating apparatus of a large capacity.

2. Description of the Related Art

Conventional ozone generating apparatuses have the configuration shown in FIG. 11. Conventional ozone generating apparatuses comprise a glass tube 1, a metal film 2 formed in an inner wall of the glass tube 1 so as to function as a high voltage electrode, a cylindrical metal tube 3 arranged outside the glass tube 1 coaxially with the glass tube so as to function as a grounding electrode. The metal tube 3 is fixed to an ozone generating tank 4 which is electrically grounded. A power feeding brush 30 is inserted inside the metal film 2, an alternating high voltage is supplied to the metal film 2 from an alternating high voltage power supply 11 provided outside the ozone generating tank 4 through a power feeding member 9. A bushing 10 is provided so as to supply the alternating high voltage in the ozone generating tank 4 which is grounded. When the alternating high voltage is applied between the metal film 2 and the metal tube 3, discharge is generated in a discharge gap 12 between the glass tube 1 and the metal tube 3. In ordinary apparatuses, a discharge gap is maintained to be 1 mm or less.

Dry air or oxygen gas to which nitrogen gas is slightly added is introduced from a gas inlet 13 which is provided at the ozone generating tank 4 and is led to the discharge gap 12. When the dry air or the oxygen gas to which the nitrogen gas is added is flowed through the discharge gap 12, oxygen in the dry air or the oxygen gas to which the nitrogen gas is added is dissociated by discharge so as to generate ozone. The generated ozone gas is exhausted from a gas outlet 14. A part of energy which is generated by discharge is used for generating ozone gas, and the rest of energy is converted to heat energy to heat the glass tube 1 and the metal tube 3. In order to cool the glass tube 1 and the metal tube 3, cooling water is flowed outside the metal tube 3 so as to prevent the glass tube from being damaged and to contribute to generating ozone efficiently. In ordinary ozone generating apparatuses, a large number of discharge tubes comprising a glass tube, a metal film and a metal tube which are fixed to an ozone generating tank 4, and alternating high voltage power is supplied in parallel from one alternating high voltage power supply 11 to the metal films formed in an inner wall of the large number of glass tubes.

When the glass tube 1 is degraded or damaged by some causes, short circuit current flows from an alternating high voltage power supply 11 to the metal film 2 formed in the inner wall of the glass tube 1. In order to cut off short-circuit current; a fuse is provided to each glass tube 1, though the fuse is not shown in FIG. 11. Alternatively, a short circuit phenomenon is detected by an alternating high voltage power supply so as to shut off the power supply. Alternatively, as described in Patent Application WO 2006-103945, a metal film 2 comprises a metal thin film, and substitution function of the fuse can be exhibited by melting and making the metal thin films disappear by short-circuit current so as to shut off the short-circuit current.

In Japanese Utility Model Application Laid-Open No. 53-160456A, a power feeding brush 30 comprises a large number of metal thin wires 31, a brush shaft 32 and a terminal 8 connected to the brush shaft. As a metal film 2 comprises a thin film, the diameter of the metal thin wire is made to be a diameter of about 0.2 mm so as not to damage the metal film 2. Further, the metal thin wire is made of stainless steel so as to prevent the deterioration caused by ozone gas. Further, in order to supply an electrical power uniformly from the power feeding brush 30 to the metal film 2, a large number of metal thin wires 31 are mounted on the brush shaft 32.

In Japanese Patent Application Laid-Open No. 8-151201, an apparatus having the configuration in which a brush comprising a brush shaft and a large number of metal thin wires is used as an electrode without using a metal film as an electrode is proposed.

SUMMARY OF THE INVENTION

As conventional ozone generating apparatuses have above-mentioned configurations, in general, the current flowing in one discharge tube is 1 A or lower. However, when a glass tube is degraded or damaged by some causes, short-circuit current flows from an alternating high voltage power supply into a metal film of the damaged glass tube. Further, in a case of an apparatus having a capacity of generating large amount of ozone, the apparatus has the configuration in which 100 or more discharge tubes, in some cases, 1000 or more discharge tubes are fixed to an ozone generating tank, a voltage is fed in parallel from one power supply to the large number of discharge tubes. In the ozone generating apparatus having the configuration, as the large number of discharge tubes are connected in parallel, when short-circuit current flows into the discharge tubes, not only energy from a power supply but also energy stored in other discharge tubes as capacitive energy flows into the short-circuited discharge tube. The amount of energy stored in 100 or more discharge tubes is very large, and this energy is consumed as short-circuit current which flows into one discharge tube. Consequently, heat generation is a significant problem. Further, there is a problem such that when a large current flows in metal thin wires, the metal thin wires are heated with joule heat to be a high temperature, and as a result, the metal thin wires are melted because stainless steel has a high resistivity and a high contact resistance. Further, there is a problem such that a contact resistance between a metal thin wire and metal film increases due to deterioration caused by long-term operation such as oxidation, the metal thin wires are heated with joule heat to be a high temperature, and as a result the metal thin wires are melted. Further, there is a problem such that when the temperature of a brush shaft is increased with the heat generated by melting the metal thin wires, the brush shaft is deformed so as to destroy the glass tube. Under these conditions, other glass tubes of the apparatus are also destroyed.

In an ozone generating apparatus in which a fuse is not provided, in a case when power is supplied from an alternating high voltage power supply to a discharge tube again after short-circuit current is cut off, current concentrates on a metal film of the damaged tube again, therefore, operation of the apparatus can not be resumed. In this case, it takes a time to restart the ozone generating apparatus because the ozone generating tank 4 has to be opened and the damaged glass tube has to be exchanged.

The present invention was made so as to solve the above-mentioned problems, an objective of the present invention is to provide an ozone generating apparatus having high reliability which can prevent a glass tube from being damaged even if large short-circuit current flows and a feeding brush melts.

Further, another objective of the present invention is to provide an inexpensive ozone generating apparatus having high reliability which can operate without stopping of operation due to damage of a glass tube even a fuse is not provided for each tube glass.

An ozone generating apparatus according to the present invention has the configuration such that power supplies from an alternating high voltage power supply to a metal film formed in an inner wall of a glass tube by using a brush shaft made of metal and a power feeding brush comprising a brush shaft and a large number of metal thin wires wherein the metal thin wires are fixed to the periphery of the brush shaft; and when $\beta=N \times d^2/(4 \times D2)$, the following equation satisfies;

$$(D2/D1) \geq 1/\{1+(1/20\beta)\},$$

wherein 'N' indicates the number of a large number of metal thin wires per unit length of the brush shaft, 'd' indicates a wire diameter of the metal thin wire, 'D1' indicates an outer diameter of a bundle of metal thin wire comprising a large number of metal thin wires, 'D2' indicates an outer diameter of the brush shaft and '$\beta$' indicates the line density of the metal thin wires on a surface of the brush shaft.

According to the present invention, an ozone generating apparatus comprises a power feeding brush comprising a brush shaft which is thickened and metal thin wires whose length are shortened. Therefore, even if the metal thin wires are melted by the short-circuit current or the increased joule's heat generation caused by the increased contact resistance, the temperature of the brush shaft is not increased to be its melting point. Consequently, the brush shaft will not be melted and a glass tube will not be damaged. As a result, the present invention can provide an ozone generating apparatus having high reliability.

DESCRIPTION OF THE PREFERRED EMBODIMENTS

First Embodiment

Figure 1:
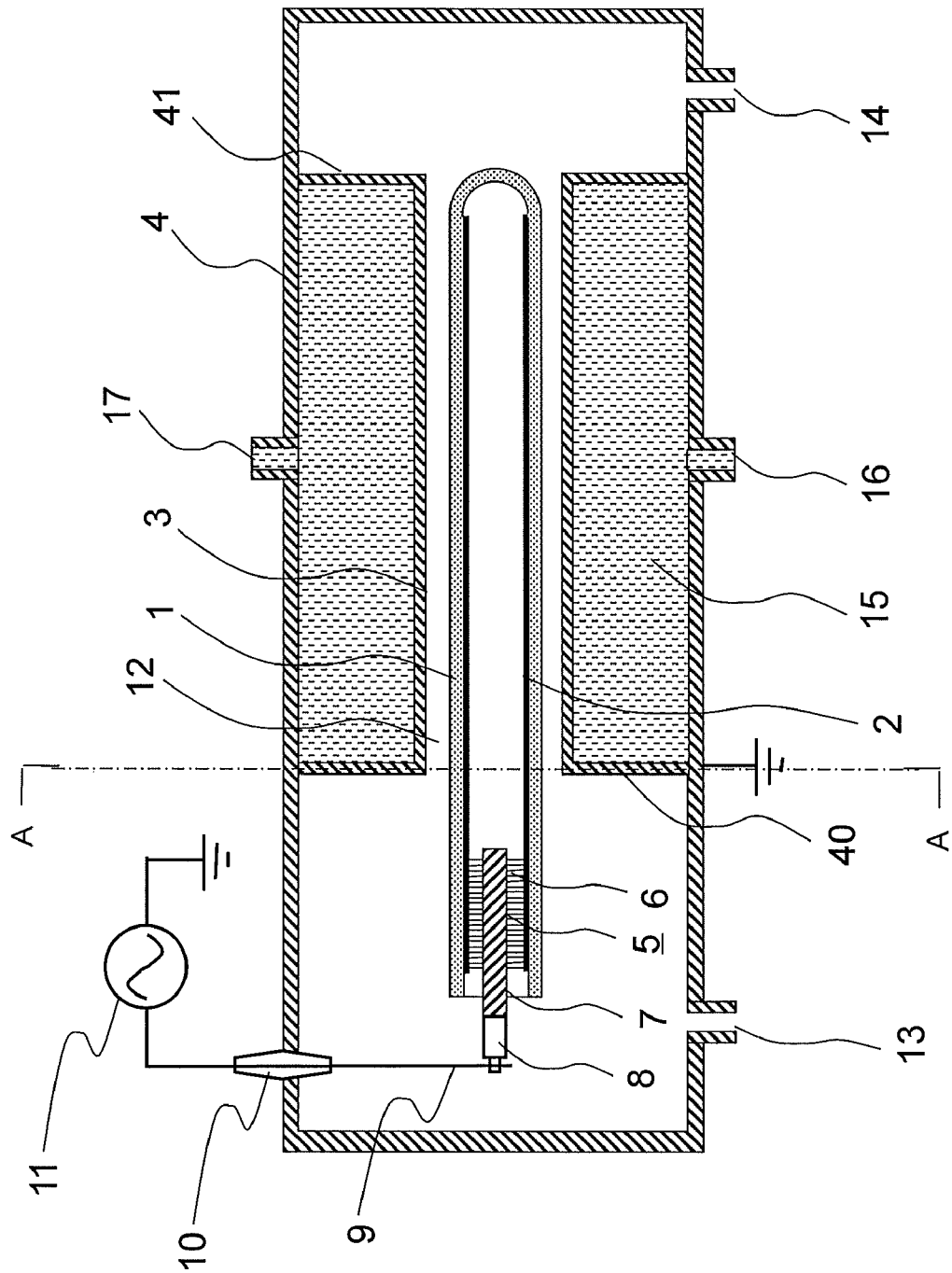
FIG. 1 is a side cross sectional view showing the outline of an ozone generating apparatus according to first embodiment of the present invention.
Figure 2:
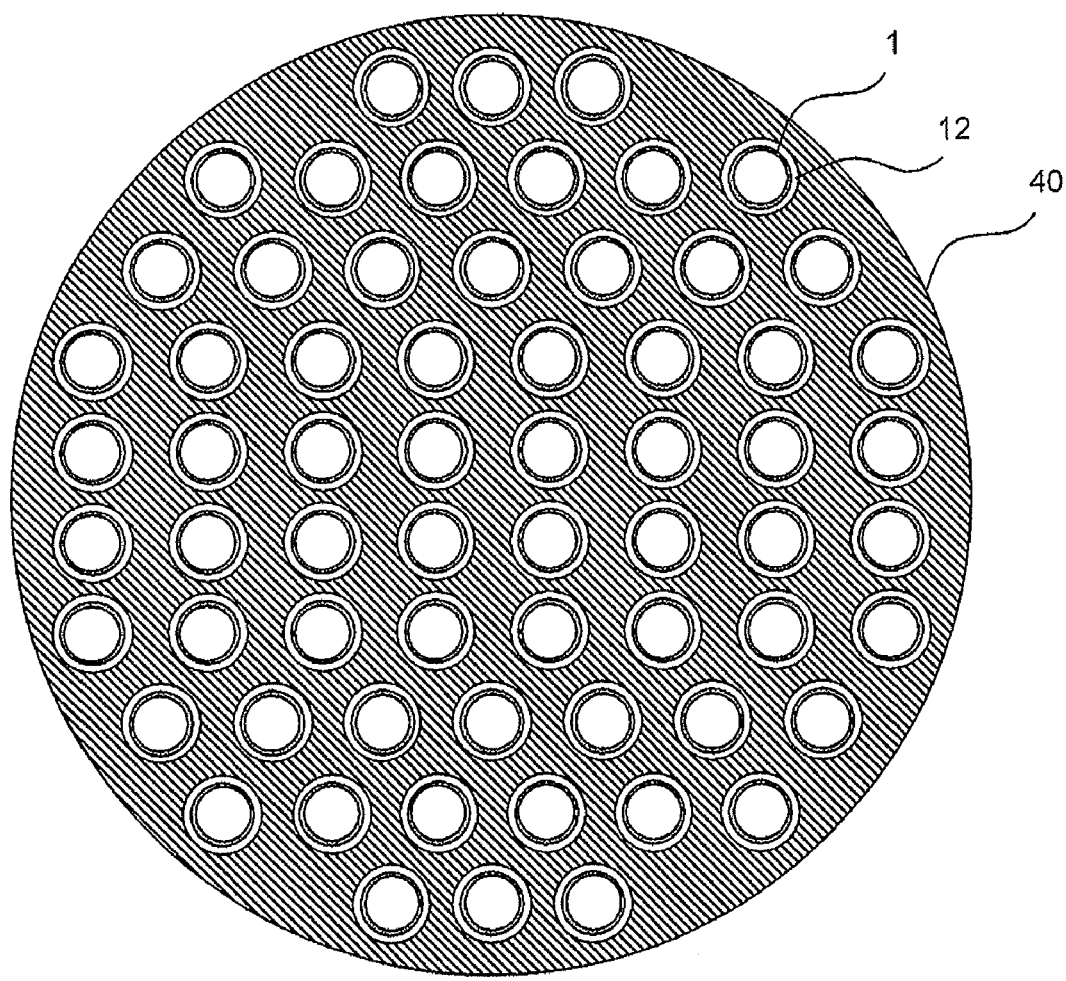
FIG. 2 is a cross sectional view showing the outline of an ozone generating apparatus according to first embodiment of the present invention taken along the line A-A of FIG. 1.

Hereinafter, first embodiment will be described referring to FIG. 1. FIG. 1 is a side cross sectional view showing a main part of the present invention. In order to describe the configuration, only one discharge tube is shown in FIG. 1, however, a large number of discharge tubes are arranged in parallel in an ozone generating apparatus according to the present invention. FIG. 2 is a view taken along the line A-A in FIG. 1 showing an ozone generating apparatus comprising a large number of discharge tubes which are arranged in parallel. In order to understand the configuration easily, in FIG. 2, the configuration in which 64 discharge tubes are arranged in parallel is shown, however, in an ozone generating apparatus according to the present invention, 100 or more discharge tubes are arranged in parallel.

A metal film 2 which functions as a high voltage electrode is formed in contact with the inner wall of a glass tube 1, and a cylindrical metal tube 3 which functions as a ground electrode is arranged outside the glass tube 1 so as to be coaxial with the glass tube 1. The right side end of the glass tube 1 is sealed. An ozone generating tank 4 which is a sealed vessel is divided into three spaces by two tube sheets 40 and 41. A metal tube 3 is fixed so as to connect a hole formed in the tube sheet 40 and that in the tube sheet 41. The ozone generating tank 4 and the tube sheets 40 and 41 are electrically grounded. A predetermined gap, that is, a discharge gap 12 is formed between an outer wall of the glass tube 1 and the metal tube 3. The discharge gap 12 is maintained to be a predetermined size, for example, 0.4 mm or less. The numeral 5 indicates a power feeding brush which is inserted from one side of the glass tube 1 into inside of the glass tube and is contacted with a metal film 2. The power feeding brush 5 comprises a large number of metal thin wires 6 made of stainless steel, a brush shaft 7 made of stainless steel and a terminal 8. One output terminal of an alternating high voltage power supply 11 is grounded, and another output terminal, that is, the high-voltage terminal, is connected to a power feeding member 9. The numeral 10 indicates a bushing which passes through an ozone generating tank 4, a power feeding member 9 passes through inside of the bushing, and the power feeding member 9 is provided so as to be insulated from the ozone generating tank 4. A terminal 8 of the power feeding brush 5 is connected to the power feeding member 9.

As shown in FIG. 2 which is a cross sectional view taken along the line A-A of FIG. 1, an ozone generating apparatus according to the present invention has the configuration such that a large number of glass tubes 1 are arranged in parallel in an ozone generating tank 4, and one power feeding brush 5 supplies alternating high-voltage to the metal film 2 formed in an inner wall of one glass tube 1. A large number of power feeding brushes 5 are connected in parallel by the power feeding member 9 which is introduced from the alternating high voltage power supply 11 through the brushing 10 into the ozone generating tank 4. The numeral 13 indicates a gas inlet which is provided at the ozone generating tank 4 and the numeral 14 indicates a gas outlet which is provided at the ozone generating tank 4. The numeral 15 indicates cooling water which flows outside of the cylindrical metal tube 3, the numeral 16 indicates a cooling water inlet provided at the ozone generating tank 4, and the numeral 17 indicates a cooling water outlet provided at the ozone generating tank 4.

Figure 3:
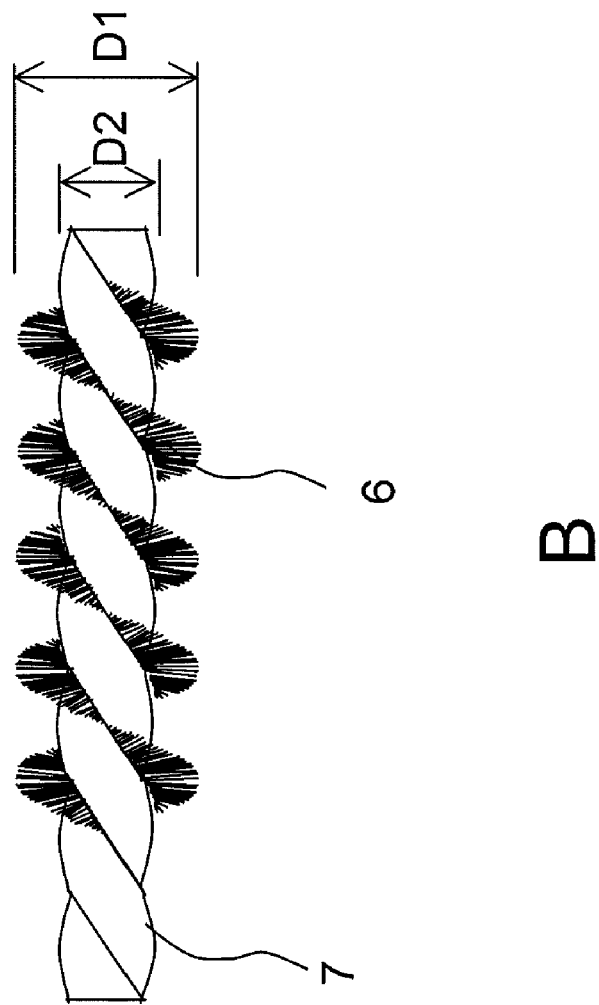
FIG. 3 is an enlarged view of a power feeding brush of an ozone generating apparatus according to first embodiment of the present invention.
Figure 3:
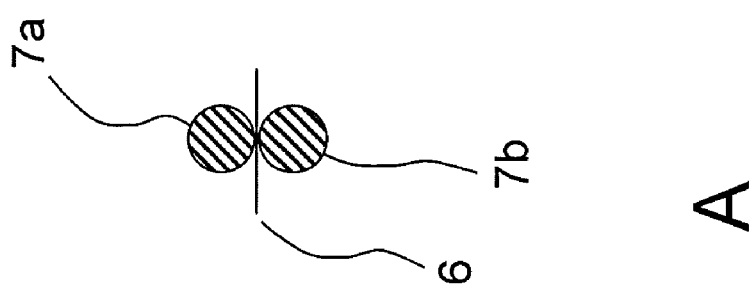

FIG. 3 is a view showing the detailed configuration of a power feeding brush according to first embodiment of the present invention. The brush shaft 7 comprises two strands, 7a and 7b. The brush shaft 7 comprises two strands 7a and 7b, and metal thin wires 6, wherein the metal thin wires 6 are inserted between the strands 7a and 7b and then the strands 7a and 7b are twisted. For example, the metal thin wire 6 has a wire diameter of 0.1 mm, the glass tube has an inner diameter of 19 mm, a bundle of metal thin wires comprising a large number of metal thin wires has an outer diameter D1 of 20 mm and the brush shaft has an outer diameter D2 of 8 mm. It is desirable such that a wire diameter of the metal thin wire 6 is 0.15 mm or less so as not to damage the metal film formed in the inner wall of the glass tube.

Next, the operation will be described. An alternating high voltage is applied from the alternating high voltage power supply 11 to the metal film 2 through the power feeding member 9 and the power feeding brush 5. As an alternating high voltage is applied between the metal film 2 and the metal tube 3, so-called silent discharge is generated in the discharge gap 12. When dry air or oxygen gas to which nitrogen gas is slightly added as a material gas is introduced from the gas inlet 13, the material gas flows through a space at the side of the gas inlet which is formed by the tube sheet 40 and the ozone generating tank 4, the discharge gap 12 and a space at the side of the gas outlet which is formed by the tube sheet 41 and the ozone generating tank 4, and leads to the gas outlet 14. When the material gas flows through the discharge gap 12, oxygen in the material gas is dissociated by discharge so as to generate ozone. In order to generate ozone efficiently, the discharge gap is maintained to be a predetermined size, such as 0.4 mm or less. Further, in order to remove heat generated by discharge, the metal tube 3 is cooled by cooling water flowing along an outer wall of the metal tube 3, and the glass tube is cooled through a gas in the discharge gap. As shown in FIG. 1 and FIG. 2, a large number of discharge tubes comprising the metal tube 3 and the glass tube 1 having the metal film 2 formed therein are arranged in parallel in the ozone generating tank, gas flows through a large number of discharge gaps 12, and an alternating high voltage is applied in parallel from one power supply to the large number of discharge tubes. As above-mentioned, discharge is generated in the large number of discharge gaps so as to generate ozone.

In a case when the glass tube is degraded or damaged due to some causes during use of ozone generating apparatus, short-circuit current flows from the alternating high voltage power supply 11 to the metal film 2 formed in the damaged glass tube. Further, the short-circuit current includes a current flowing from capacitive energy stored in capacitance (capacitor) formed by other discharge tubes which are connected in parallel. When short circuit current flows, the metal thin wires 6 are heated with joule's heat generated by the contact resistance between the metal thin wires 6 and the metal film 2 and is heated with joule's heat generated by the volume resistance of the metal thin wires. Consequently, the metal thin wires are melted instantaneously (in the order of 100 ms). When the metal thin wires are heated, it is necessary to prevent the temperature of the brush shaft from reaching a melting temperature due to the heat energy which the brush shaft receives from the metal thin wires 6 having a high temperature. In conventional ozone generating apparatuses, a brush shaft is thin, so the brush shaft may be possibly melted.

As a result of keen examination of inventors of the present invention, it has been found out such that a brush shaft is not melted under the following conditions. Weight of brush shaft per unit length of the longitudinal direction of brush, indicated by M, and total weight of a part which is projected from the brush shaft of metal thin wires per unit length of the longitudinal direction of brush, indicated by 'm' are obtained by the following equation.

$$M=(\pi/4)\times(D2)^2\times\rho \quad (1)$$

$$m=(\pi/4)\times N\times N\times d^2\times(D1-D2)\times\rho \quad (2)$$

In the equation, 'N' indicates the number of thin wires which are used per unit length of the longitudinal direction of brush, 'd' indicates a wire diameter of metal thin wire, 'D1' indicates an outer diameter of the brush, 'D2' indicates an outer diameter of the brush shaft, and ρ indicates a specific gravity of the brush shaft and the metal thin wire.

The amount of heat Q which is generated by melting the metal thin wires made of stainless steel in an oxygen gas is approximately 7000 [J/g] per unit weight of the metal thin wires.

$$Q=m\times7,000[J/g] \quad (3)$$

When the ratio indicated by 'a' of the amount of heat Q is absorbed in the brush shaft, the temperature rise, indicated by 'ΔT' is obtained by the following equation (4).

$$\Delta T=Q\times\alpha/(M\times C)=m\times7,000\times\alpha/(M\times C) \quad (4)$$

In the equation, 'C' indicates a specific heat of the brush shaft [J/g K].

In a case of the brush shaft which is made of stainless steel, in order to prevent the shaft from being melted, it is necessary to make the temperature rise indicated by 'ΔT' to be lower than approximately 1500 degrees. When the equation, C=0.51 [J/g K] (stainless steel material) is substituted in the equation (4), the following equations are obtained.

$$\Delta T=m\times7,000\times\alpha/(M\times0.51)\leq1,500$$

$$M/m7,000\times\alpha/(0.51\times1,500)=9.15\times\alpha \quad (5)$$

Among the amount of heat which is generated by melting metal thin wires in an oxygen gas, as the brush is heated by the heat which is generated from a part which is lower than the brush shaft, 'a' is approximately 0.5. Therefore, the following equation is obtained.

$$M/m\geq9.15\times0.5$$

In the above equation, the value obtained by the equation, 9.15×0.5, is approximately 5, therefore, the following equation is obtained.

$$M/m\geq5 \quad (6)$$

Based on the equations (1), (2) and (6), the following equation is obtained.

$$(D2)^2/[N\times d^2\times(D1-D2)]\geq5 \quad (7)$$

When an experiment was carried out by using an actual brush of an ozone generating apparatus according to the present invention, the brush was not melted when the equation (7) satisfies. Accordingly, it was found out such that a brush is not melted when the ozone generating apparatus satisfies at least the equation (7).

Further, the line density of metal thin wires on a surface of the brush shaft (total cross-sectional area of metal thin wires/surface area of shaft) is obtained by the following equation.

$$\beta=[(\pi/4)\times d^2\times N]/(\pi\times D2)=N\times d^2/(4\times D2) \quad (8)$$

When the equation (7) is transformed by using 'β' the following equation is obtained.

$$(D2/D1) \geq 1/\{1+1/20\beta)\} \quad (9)$$

That is, when the equation (9) satisfies, a brush shaft is not melted.

A brush having metal thin wires made of stainless steel whose diameter is in a range of 0.03 mm to 0.15 mm and having a brush shaft Made of stainless steel whose diameter is in a range of 3 mm to 8 mm was manufactured and evaluated. According to the result, when the line density 'β' is in a range of 0.005 to 0.04, the brush is practical. When 'β' is 0.005 or lower, the number of metal thin wires is small, in manufacturing a brush, thin wires broke easily, electric current concentration to one thin wire becomes great, and in some cases, a metal film is degraded.

Further, when 'β' is 0.04 or above, a phenomenon in which thin wires are pulled out from a brush shaft occurred and the cost of manufacturing a brush increases. The most preferable line density 'β' is in a range of 0.01 to 0.03. The result shown in Table 1 is obtained by calculating the equation (9) in a case when 'β' is in the above-mentioned range

TABLE 1

| | β | | | | |
|---|---|---|---|---|---|
| | 0.005 | 0.01 | 0.02 | 0.03 | 0.04 |
| D2/D1 | More than 0.091 | More than 0.167 | More than 0.29 | More than 0.38 | More than 0.44 |

In First Embodiment, the ratio D2/D1 between a diameter of a brush shaft and an outer diameter of bundle of metal thin wires satisfies the following equation;

$$(D2/D1) \geq 1/[1+20\beta)],$$

wherein 'β' indicates the line density of metal thin wire, 'D1' indicates an outer diameter of a bundle of metal thin wires and 'D2' indicates a diameter of a shaft of brush. Under the above-mentioned conditions, even if metal thin wires 6 are melted by short-circuit current; the brush shaft 7 is not melted. Accordingly, a glass tube can prevent from being cracked or damaged. As a result, an ozone generating apparatus having high reliability can be provided.

Second Embodiment

Figure 4:
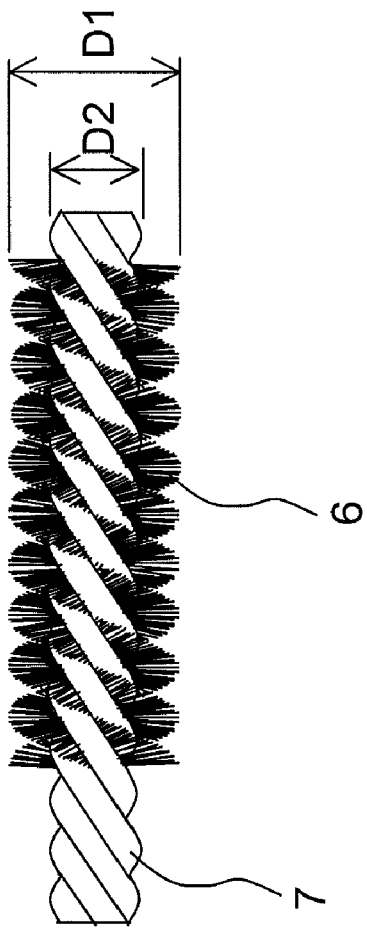
FIG. 4 is an enlarged view of a power feeding brush of an ozone generating apparatus according to second embodiment of the present invention.
Figure 4:
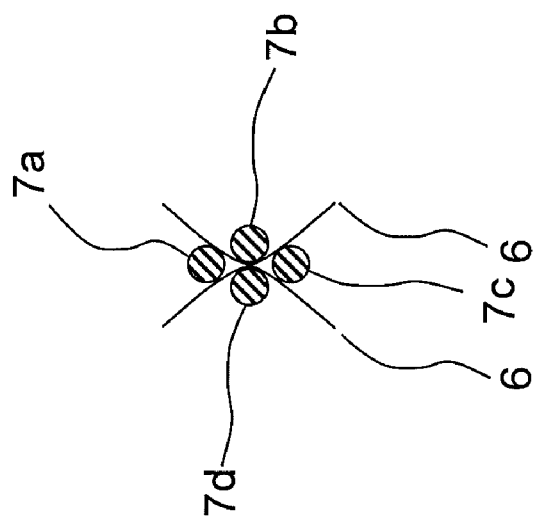

Next, Second Embodiment of the present invention will be described referring to FIG. 4. A brush shaft comprises four strands 7a, 7b, 7c and 7d. Metal thin wires are sandwiched between four strands in a V shape or in an inverted-V shape, and then the four strands are twisted so as to form a brush. The total number of metal thin wires used in the configuration of FIG. 4 is same as that of FIG. 3. However, in the configuration of FIG. 4, metal thin wires are dispersed and electric current can be uniformly applied. When a power feeding brush is used for a long period, due to oxidation, contact resistance is increased on a surface where metal thin wires and a metal film are contacted. Consequently, electrical conductive performance degrades. When the configuration of FIG. 4 is adopted, electric current can be dispersed. Consequently, a degradation rate can be suppressed. Accordingly, an ozone generating apparatus having higher reliability and long-term life can be provided.

Further, the number of strands may be four or more. The more the number of strand is, the more uniformly electric current can be applied.

Third Embodiment

Figure 5:
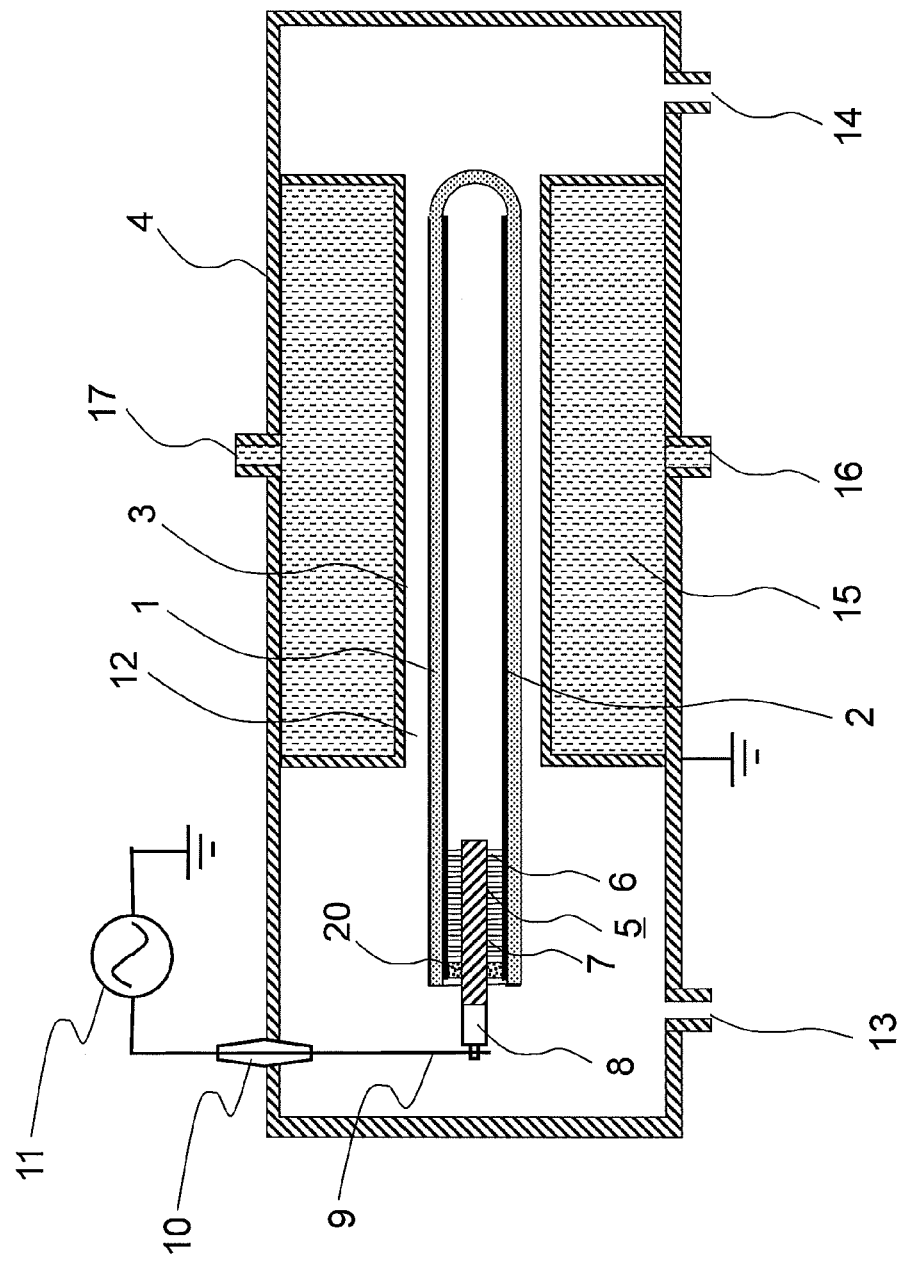
FIG. 5 is a side cross sectional view showing the outline of an ozone generating apparatus according to third embodiment of the present invention.
Figure 6:
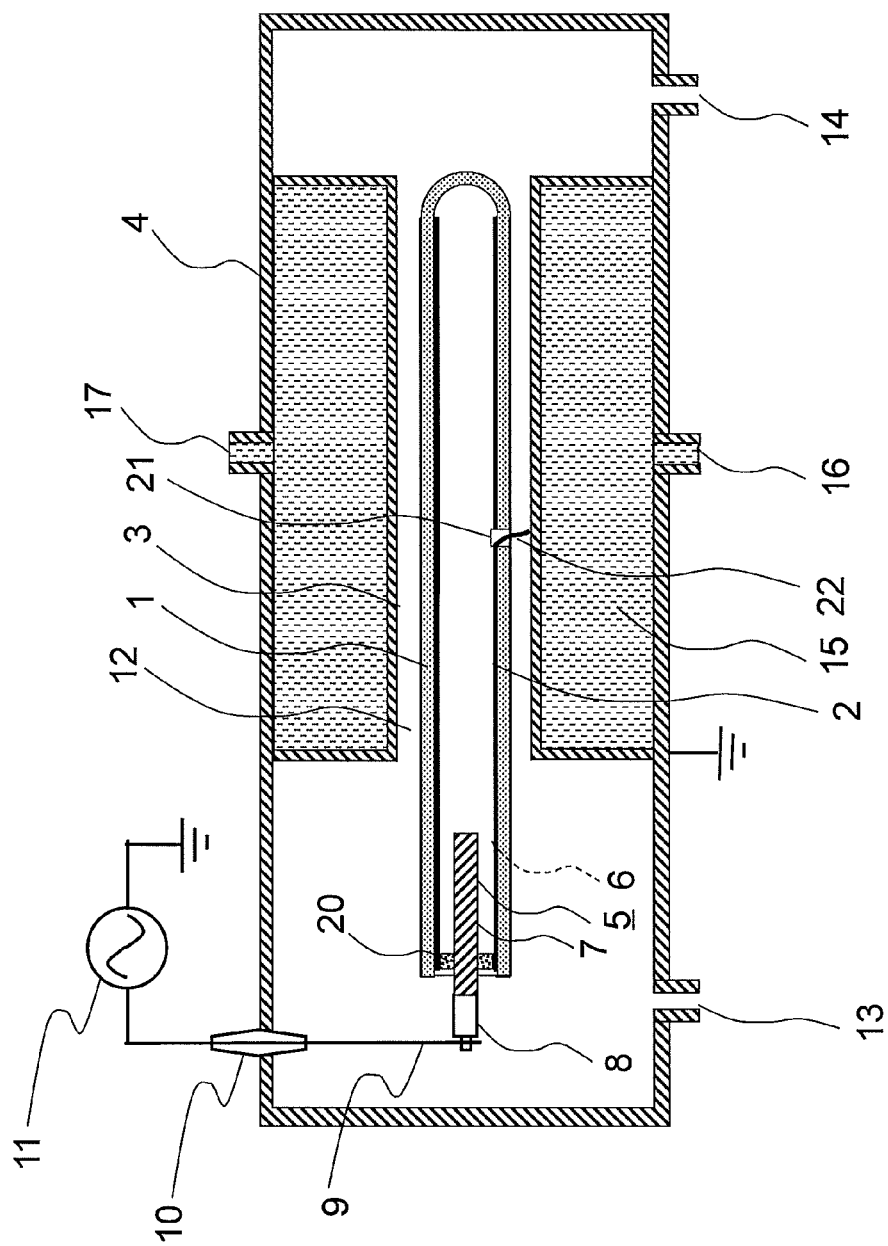
FIG. 6 is a side cross sectional view showing the outline of the state where the metal thin wires of a power feeding brush of an ozone generating apparatus according to third embodiment of the present invention disappears.

Next, Third Embodiment of the present invention will be described referring to FIG. 5. A disc-shaped supporting member 20 made of ceramic is fixed to the brash shaft 7 of the power feeding brush 5. An outer diameter of the supporting member 20 is made to be slightly smaller than an inner diameter of the metal film 2. FIG. 6 shows the configuration where the glass tube is damaged, and metal thin wires 6 are melted and disappear. In a damaged portion 21 of the glass tube 1, a hole is made, the electric potential of the metal film 2 becomes almost same as that of the metal tube 3 (ground). A high voltage is applied to the brush shaft 7. However, the brush shaft 7 is insulated from the metal film 2 while keeping a distance by the supporting member 20 made of ceramic and the power feeding member 9. Consequently, an ozone generating apparatus according to the present invention can be continuously operated. Accordingly, an ozone generating apparatus having high reliability can be provided.

Fourth Embodiment

Figure 7:
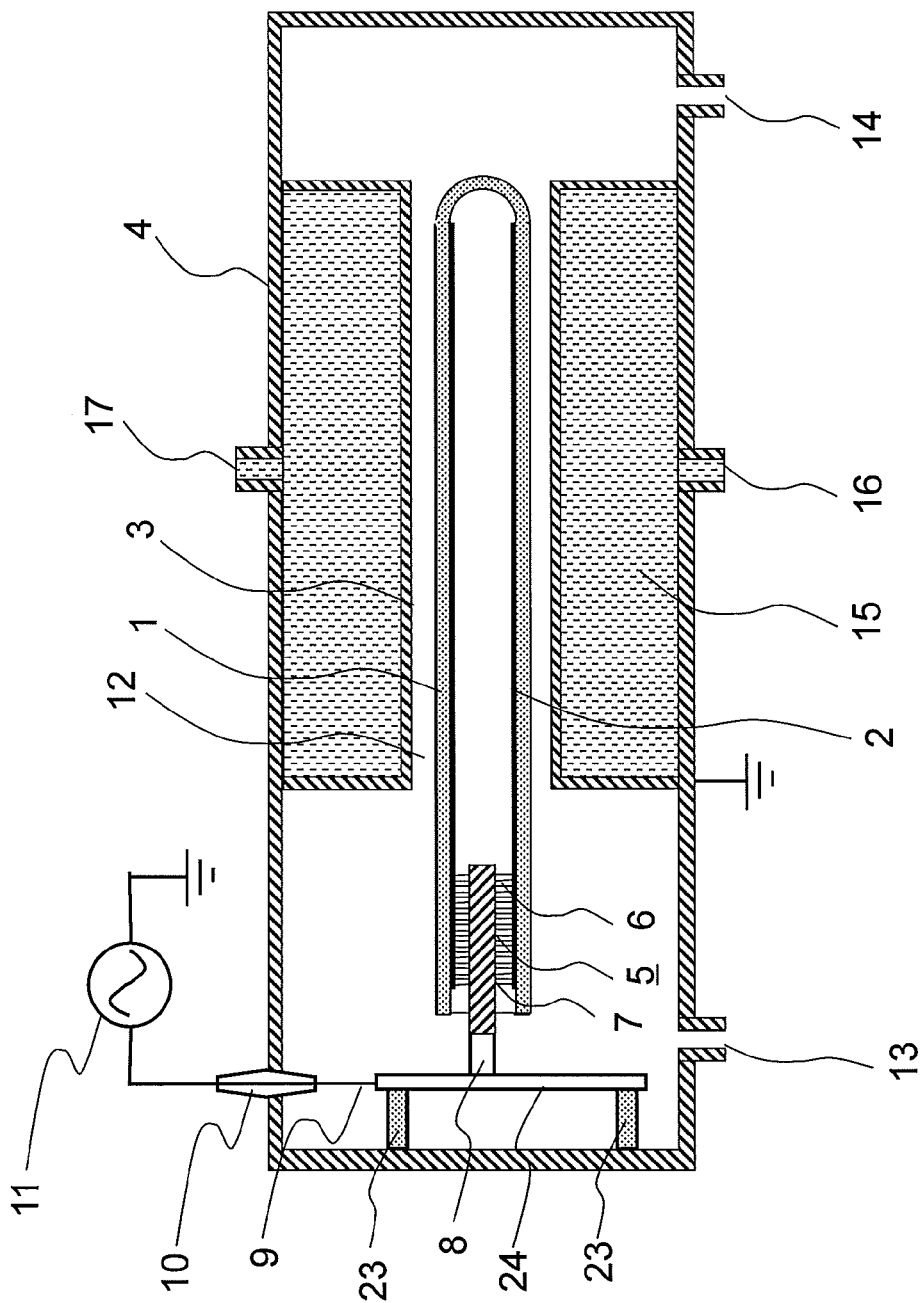
FIG. 7 is a side cross sectional view showing the outline of an ozone generating apparatus according to fourth embodiment of the present invention.
Figure 8:
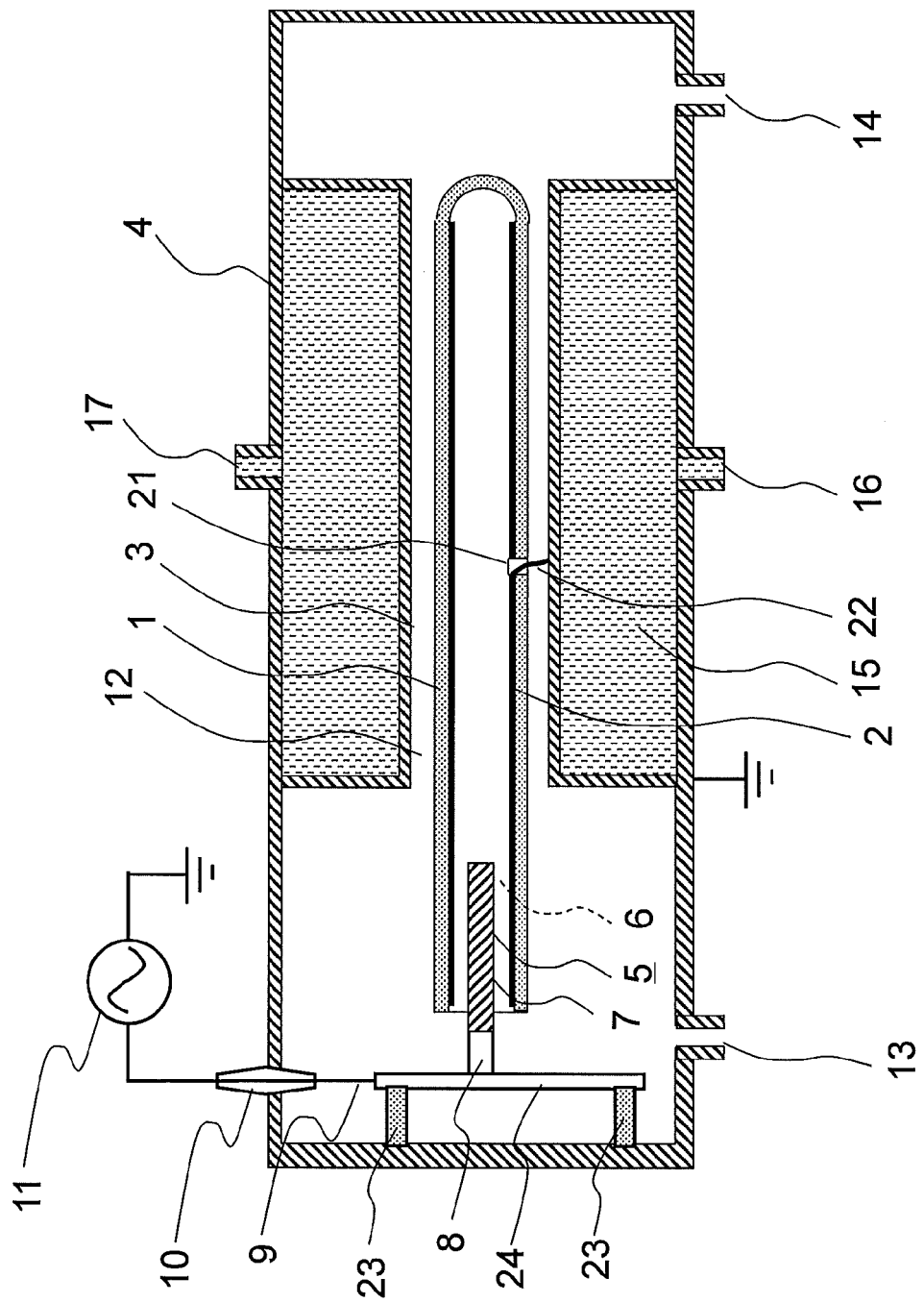
FIG. 8 is a side cross sectional view showing the outline of the state where the metal thin wires of a power feeding brush of an ozone generating apparatus according to fourth embodiment of the present invention disappear.

Next, Fourth Embodiment of the present invention will be described referring to FIG. 7. A power feeding brush 5 is fixed to a fixed power feeding member 24 which is fixed in a wall of the ozone generating tank 4, which is the sealed vessel, by insulators 23. FIG. 8 shows the configuration where the glass tube is damaged, and metal thin wires 6 are melted and disappear. In a damaged portion 21 of the glass tube 1, a hole is made, the electric potential of the metal film 2 becomes almost same as that of the metal tube 3 (ground). As the brush shaft 7 is fixed by the insulators 23 and the fixed power feeding member 24, even after the metal thin wires 6 disappear, the brush shaft 7 is insulated from the metal film 2 while keeping a distance. Consequently, even if a high voltage is applied to the brush shaft 7, an ozone generating apparatus according to the present invention can be continuously operated. Accordingly, an ozone generating apparatus having high reliability can be provided.

Fifth Embodiment

Figure 9:
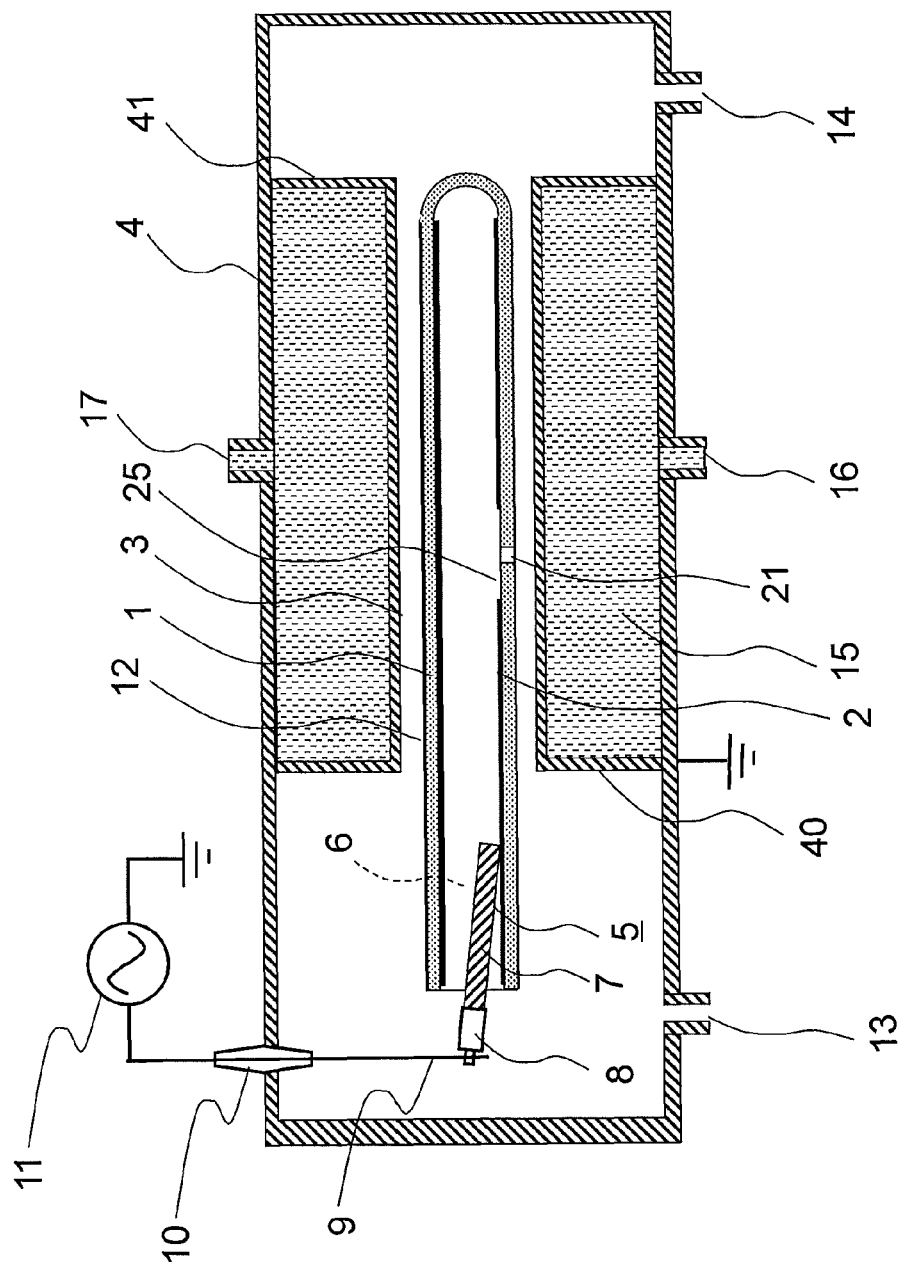
FIG. 9 is a side cross sectional view showing the outline of the state where the metal thin wires of a power feeding brush of an ozone generating apparatus according to fifth embodiment of the present invention disappear.

Next, Fifth Embodiment of the present invention will be described referring to FIG. 9. A metal film 2 comprises a conductive thin film having a thickness in a range of 0.05 μm to 100 μm. Material of the metal film 2 includes any of stainless steel, chromium, gold, silver, tin, zinc, copper, carbon and aluminum as a main component or material of the metal film 2 includes nickel or nickel as a main component and a conductive compound comprising oxygen resistance material or an ozone resistant material. The metal film 2 is formed by closely sticking the above-mentioned material to or by plating the above-mentioned material in an inner wall of a glass tube 1. When the glass tube 1 is damaged, a metal film 25 formed at the periphery of a damaged portion 21 is instantaneously evaporated or disappears by large short-circuit current. Therefore, even if the metal thin wires 6 disappear and the brush shaft 7 is brought into contact with the metal film 2 by its own weight, the metal film 2 is insulated from the damaged portion 21; therefore, a voltage can be continuously applied. Consequently, an ozone generating apparatus according to the present invention can be continuously operated. As a result, an ozone generating apparatus having high reliability can be provided.

Further, in Fifth Embodiment of the present invention, a metal film formed in an inner wall of a glass tube comprises a conductive thin film and a power feeding brush is arranged outside a part in which a discharge gap is formed, that is, in a part which is protruded from the tube sheet 40. Therefore, even if a part of a glass tube, which is positioned closer to a feeding brush, is damaged, an insulation distance between the damaged portion of the glass tube and a power feeding part can be secured, because a metal film disappears. Therefore, even if metal thin wires 6 disappear and the brush shaft 7 is brought into contact with the metal film 2 by its own weight, the metal film 2 is insulated from the damaged portion. Therefore, a voltage can be continuously applied. Consequently, an ozone generating apparatus according to the present invention can be continuously operated. As a result, an ozone generating apparatus having high reliability can be provided.

Sixth Embodiment

Next, Sixth Embodiment of the present invention will be described. When the amount of ozone which is generated in an ozone generating apparatus increases, the short-circuit current becomes high. Therefore, short-circuit current can not be cut off only by keeping the insulation distance as shown in FIG. 6, FIG. 8 and FIG. 9. In this case, short-circuit current can be cut off by providing a fuse between the power feeding brush 5 and the power feeding member 9 (not shown in FIGs.). Alternatively, short-circuit current may be cut off by detecting the short-circuit phenomenon and shutting off a power supply.

Figure 10:
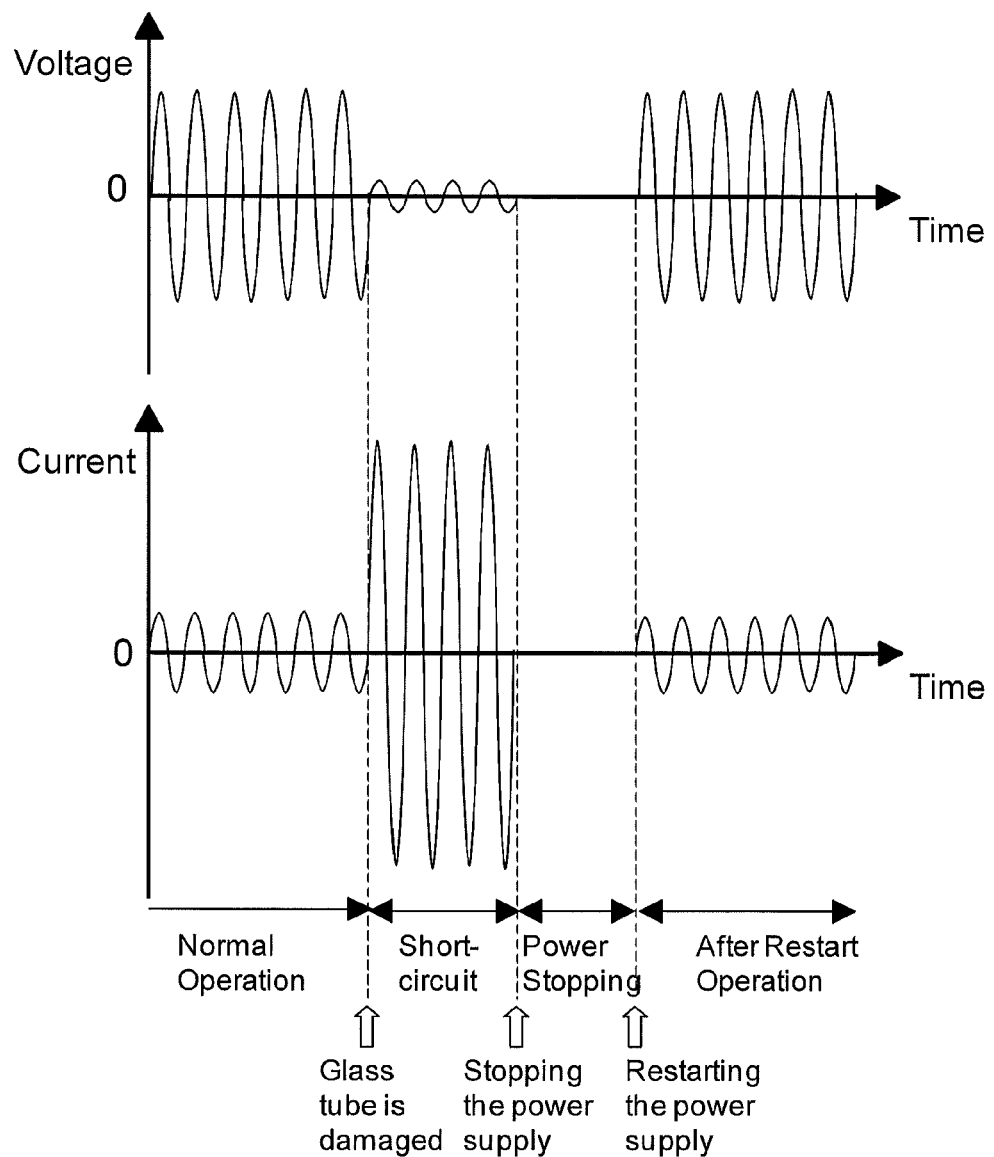
FIG. 10 is a diagram showing the operation of an ozone generating apparatus according to sixth embodiment of the present invention.
Figure 11:
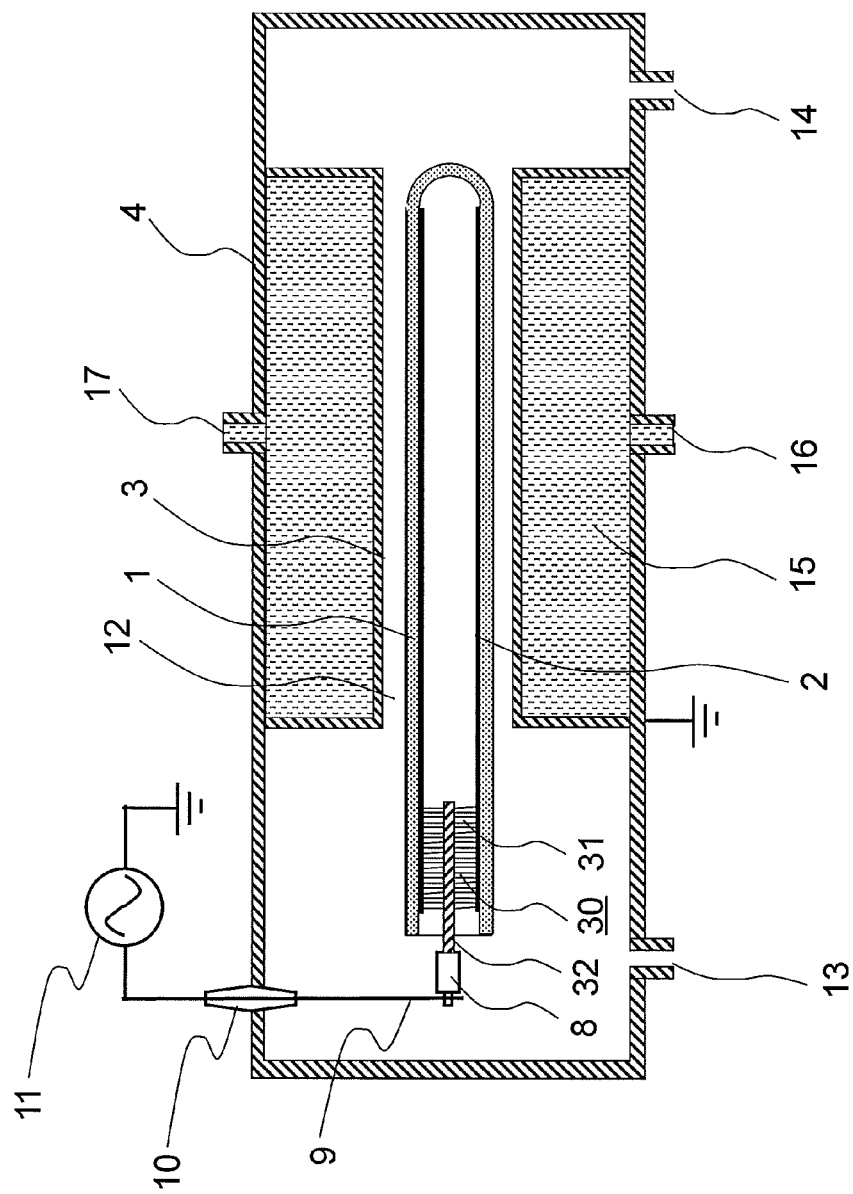
FIG. 11 is a view showing the configuration of a conventional ozone generating apparatus.

FIG. 10 shows the voltage which is applied to an ozone generating apparatus and the current waveform. When a glass tube is damaged, the voltage decreases and the amount of current which flows in the glass tube increases in comparison with a case of normal operation. When this change is detected, power supply from the power supply 11 is stopped. After a lapse of a certain time, when power supply from the power supply 11 is restarted, in an ozone generating apparatus having the configuration shown in FIG. 6, FIG. 8 and FIG. 9, a voltage can be applied again so as to continue the operation. In this case, the stopping duration of an ozone generating apparatus is approximately 1 second. Therefore, in the system in which ozone is used, operation of the system can be continued without disturbing the operation. The function as a fuse can be exerted without using a fuse by stopping the power supply once after a short-circuit phenomenon is detected and then by restarting the power supply. Consequently, an inexpensive ozone generating apparatus having high reliability can be provided.

Further, in the above, examples in which a short-circuit phenomenon is detected by a voltage and current of an ozone generating apparatus, are described, however, when a short-circuit phenomenon is detected by other means, similar effect can be achieved.

In any of the above-mentioned embodiments, heat resistance glass such as a boron silicate glass, a quartz glass, high silicate glass, alumino-silicate glass can be used as a glass tube. For example, a glass tube manufactured by SCHOTT Co. Ltd. includes Duran, Duratan, Durabax, SUPREMAX, SURPRAX, FIOLAX, ILLAX, AR-Glas, 8248, 8250, 8252, 8253, 8485, etc. By using heat resistance glass, the possibility of generating a damage of a glass tube or melting of a glass caused by heat when metal thin wires are melted is decreased. Accordingly, the possibility of exerting an adverse effect to an adjacent glass in a normal condition is decreased.

Further, in the above-mentioned embodiments, the configuration in which power is supplied from a side of a gas inlet port is described; however, the configuration in which power is supplied from a side of an outlet of ozone gas is acceptable.

What is claimed is:
1. An ozone generating apparatus, comprising:
a sealed vessel;
two tube sheets, made of conductive metal having a hole, which are provided so as to divide the inside of the sealed vessel into three spaces;
a cylindrical metal tube which is provided so as to connect the holes provided in the two tube sheets;
a cylindrical glass tube, whose one side is sealed and the other side is open, having a metal film formed in an inner wall, which is held inside of the metal tube so as to keep a predetermined gap between an outer wall of the cylindrical glass tube and an inner wall of the metal tube;
and an alternating high voltage power supply;
and having the configuration such that a raw material gas including oxygen is flowed from one space to another space of three spaces in which one space is present at one side and the another space is present at another side of the vessel, through the above-mentioned gap,
a power feeding brush comprising a stainless steel brush shaft and a plurality of stainless steel metal thin wires which are fixed to a periphery of the brush shaft, the power feeding brush being inserted into the glass tube, ends of the metal thin wires electrically contact the metal film, wherein a voltage is applied from the alternating high voltage power supply to the metal film by connecting the brush shaft to a power feeding member connected to the alternating high voltage power supply so as to make the metal film to be high electric potential, and to make the metal tube to be ground potential and a material gas flowing in the gap is discharged so as to generate ozone;
the following equations satisfy;

$$(D2/D1) \geq 1/\{1+(1/20\beta)\},$$

$$\beta = N \times d^2/(4 \times D2),$$

wherein 'N' indicates the number of the metal thin wires per unit length of brush shaft, 'd' indicates a wire diameter of the metal thin wire, 'D1' indicates an outer diameter of a bundle of metal thin wires, 'D2' indicates an outer diameter of the brush shaft and 'β' indicates the line density of the metal thin wires on a surface of the brush shaft.

2. The ozone generating apparatus as claimed in claim 1, wherein more than 100 discharge tubes comprising the metal tube and the glass tube are arranged in parallel, and power is applied in parallel from one alternating high voltage power supply to more than 100 discharge tubes.

3. The ozone generating apparatus as claimed in claim 1, wherein 'β' is in a range of 0.01 to 0.03.

4. The ozone generating apparatus as claimed in claim 1, wherein the brush shaft comprising four or more strands and metal thin wires, wherein the strands are twisted and the metal thin wires are sandwiched by the twisted strands.

5. The ozone generating apparatus as claimed in claim 1, wherein a supporting member made of ceramic is provided around the brush shaft.

6. The ozone generating apparatus as claimed in claim 1, wherein the brush shaft is fixed to a fixed power feeding member which is fixed to the sealed vessel.

7. The ozone generating apparatus as claimed in claim 1, wherein the metal film formed in an inner surface of the glass tube having a thickness in a range of 0.05 to 100 μm.

8. The ozone generating apparatus as claimed in claim 7, wherein the power feeding brush is arranged in the glass tube to protrude from one of the tube sheets.

9. The ozone generating apparatus as claimed in claim 1, wherein the operating sequence in which after the short-circuit phenomenon is detected, the alternating high voltage power supply is once shut off and then a voltage is applied again is provided.

10. The ozone generating apparatus as claimed in claim 1, the glass tube comprises any of a boron silicate glass, a quartz glass, high silicate glass and alumino-silicate glass.

* * * * *